United States Patent
Schmidt (10) Patent No.: US 8,882,059 B2
(45) Date of Patent: Nov. 11, 2014

(54) PIPE CLAMP

(75) Inventor: Matthew L. Schmidt, Avon, OH (US)

(73) Assignee: Oatey Co., Cleveland, OH (US)

( * ) Notice: Subject to any disclaimer, the term of this patent is extended or adjusted under 35 U.S.C. 154(b) by 0 days.

(21) Appl. No.: 13/100,074

(22) Filed: May 3, 2011

(65) Prior Publication Data

US 2011/0272535 A1 Nov. 10, 2011

Related U.S. Application Data

(60) Provisional application No. 61/331,134, filed on May 4, 2010.

(51) Int. Cl.
*F16L 3/12* (2006.01)

(52) U.S. Cl.
USPC ............. 248/74.3; 248/56; 248/65; 248/74.1; 248/74.5

(58) Field of Classification Search
USPC ............. 248/74.5, 74.1, 74.2, 56, 74.3
See application file for complete search history.

(56) References Cited

U.S. PATENT DOCUMENTS

| | | | |
|---|---|---|---|
| 4,260,123 A | 4/1981 | Ismert | |
| 4,840,334 A | 6/1989 | Kikuchi | |
| 4,903,920 A | 2/1990 | Merritt | |
| 4,903,921 A * | 2/1990 | Logsdon | 248/74.5 |
| 5,054,741 A * | 10/1991 | Ismert | 248/74.5 |
| 5,385,320 A | 1/1995 | Ismert et al. | |
| 5,460,342 A * | 10/1995 | Dore et al. | 248/74.2 |
| 5,739,474 A * | 4/1998 | Bradley | 174/135 |
| 6,010,100 A * | 1/2000 | Merritt | 248/74.5 |
| 6,073,891 A * | 6/2000 | Humber | 248/74.5 |
| 6,164,604 A * | 12/2000 | Cirino et al. | 248/74.3 |
| 6,666,415 B2 * | 12/2003 | Hansen | 248/74.3 |
| 7,207,530 B2 * | 4/2007 | Ismert et al. | 248/74.4 |
| 7,219,931 B2 | 5/2007 | Kato | |
| 7,658,350 B2 * | 2/2010 | Bauer | 248/65 |
| 7,896,296 B2 * | 3/2011 | Julian et al. | 248/68.1 |

\* cited by examiner

*Primary Examiner* — Amy J Sterling
(74) *Attorney, Agent, or Firm* — Calfee, Halter & Griswold LLP (57) ABSTRACT

A pipe clamp comprises a mounting post having a flexible arm extending laterally therefrom in a semi-circular arc. The arm defines with the mounting post an arcuate recess having spaced apart opposite ends between which different size pipe is selectively insertable into the recess. Opposed flexible fingers extend radially inwardly adjacent opposite ends of the recess. The fingers are axially angled between opposite sides of the clamp to facilitate bending of the fingers when contacted by the pipe during insertion of the pipe into the recess.

22 Claims, 7 Drawing Sheets

PIPE CLAMP

CROSS-REFERENCE TO RELATED APPLICATIONS

This application claims the benefit of U.S. Provisional Application Ser. No. 61/331,134, filed May 4, 2010, the entire disclosure of which is incorporated herein by reference.

FIELD OF THE INVENTION

This invention relates generally to a pipe clamp for selectively gripping and attaching different size pipe (including tubing) to a suitable support structure.

SUMMARY OF THE INVENTION

The pipe clamp of the present invention includes a mounting post having a flexible arm extending laterally outwardly therefrom in a semi-circular arc. The arm defines with the mounting post an arcuate recess sized for selective receipt of different size pipe through spaced apart opposite ends of the recess.

In accordance with one aspect of the invention, opposed flexible fingers extend radially inwardly adjacent the opposite ends of the recess toward the axial center thereof. Also such fingers are axially inwardly inclined from one side of the clamp toward the other side for ease of bending of the fingers when contacted by the pipe during insertion of the pipe into the recess and secure retention of the pipe in the recess by the fingers.

In accordance with another aspect of the invention, a pair of circumferentially spaced, axially extending ribs may be provided on the inner surface of the recess intermediate the opposite ends thereof for cradling the pipe when inserted into the recess.

In accordance with another aspect of the invention, a rib may extend inwardly from the inner surface of the recess in closely spaced substantially parallel relation to an inner side edge of each of the fingers for guiding the bending of the fingers when contacted by the pipe during insertion of the pipe into the recess.

In accordance with another aspect of the invention, the mounting post has a bottom surface that may extend below the pipe when fully inserted into the recess to provide a clearance space between the pipe and a mounting surface when the clamp is attached to the mounting surface with the bottom surface of the mounting post in engagement with the mounting surface.

In accordance with another aspect of the invention, the outermost end of the arm may have a beveled tip that extends below the bottom surface of the mounting post when the clamp is in a fully relaxed condition and after a smaller size pipe is fully inserted into the recess, whereby when the clamp with smaller size pipe is attached to the mounting surface with the bottom surface of the mounting post engaging the mounting surface, the beveled tip is cammed inwardly toward the mounting post to cause the arm to more tightly grip the smaller size pipe.

DETAILED DESCRIPTION OF THE INVENTION

Referring now in detail to the drawings, and initially to FIGS. 1-5, there is shown one form of pipe clamp 1 of the present invention for selectively mounting different size pipe (including for example PEX, CPVC and copper pipe) off a suitable mounting surface such as a vertical stud or horizontal floor or ceiling joist or the like.

Pipe clamp 1 may be molded out of a suitable plastic material such as high impact ABS, and includes a mounting post 2 and integrally molded flexible arm 3 extending laterally outwardly therefrom in an arc which as shown is greater than 180°. Arm 3 defines with mounting post 2 an arcuate recess 4 having spaced apart opposite ends 5, 6, between which the different size pipe may be selectively insertable and securely retained within the recess as described hereafter.

Recess 4 has a radius of curvature substantially greater than the radius of the different size pipe that may be selectively retained therein. For example, recess 4 may have a radius of approximately 0.50 inch when used for selectively retaining ½ inch or ¾ inch pipe. By varying the dimensions of the pipe clamp, the pipe clamp may be used to selectively retain other size pipe as well.

Adjacent the opposite ends 5, 6 of recess 4 are flexible fingers 7, 8 that extend radially inwardly toward the axial center of the recess. In addition, such fingers are axially inwardly inclined from one side 9 of the clamp toward the other side 10 (see FIGS. 1-3 and 5) for ease of bending of the fingers when contacted by the pipe during insertion of the pipe into the recess and secure retention of the pipe in the recess by the fingers.

Figure 8:
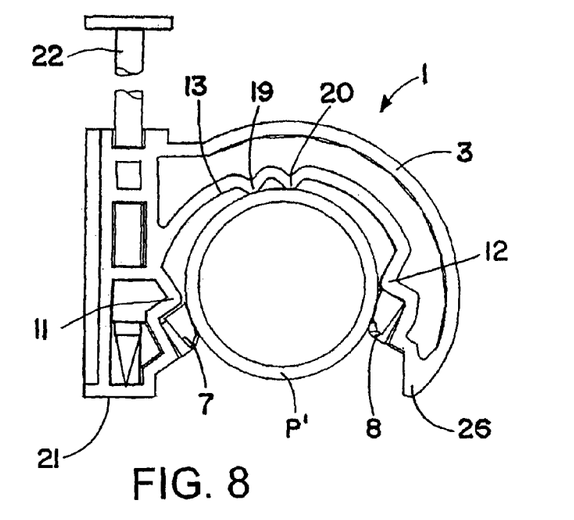
FIG. 8 is an enlarged schematic side view of the pipe clamp of FIG. 2 shown snap fitted onto a larger size pipe prior to attaching the pipe clamp to a mounting surface.

A rib 11, 12 may extend inwardly from the inner surface 13 of the recess in closely spaced substantially parallel relation to an inner side edge of the respective fingers 7, 8 for guiding the bending of the fingers when contacted by the pipe particularly during insertion of a larger size pipe into the recess as shown in FIG. 8. Also the fingers may be chamfered to provide for progressive engagement of the fingers with the pipe during insertion of the pipe into the recess.

Figure 6:
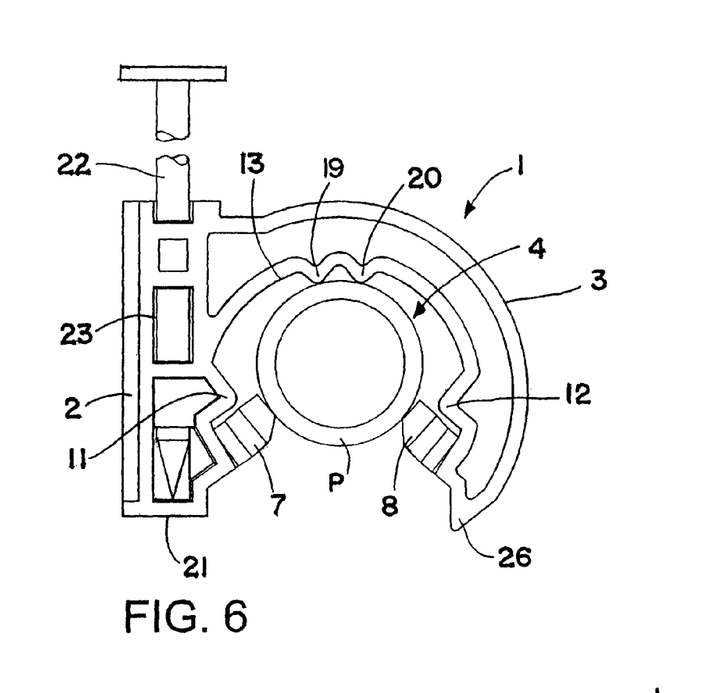
FIG. 6 is an enlarged schematic side view of the pipe clamp of FIG. 2 shown snap fitted onto a smaller size pipe prior to attaching the pipe clamp to a mounting surface.

Because the radius of recess 4 is substantially greater than the radius of the different size pipe selectively retained thereby, a pair of circumferentially spaced, axially extending ribs 19, 20 are desirably provided on the inner surface 13 of the recess intermediate opposite ends thereof for cradling the different size pipe P and P' when the clamp is snap fitted onto the pipe as shown, for example, in FIGS. 6 and 8. Once the pipe clamp is properly secured to the pipe, the pipe clamp may be attached to a suitable mounting surface S by pressing the bottom surface 21 of the mounting post 2 (which is desirably substantially flat as shown) up against the mounting surface and driving a suitable fastener such as a nail 22 through a fastener hole 23 in the mounting post into the mounting surface as shown in FIGS. 7 and 9.

Figure 7:
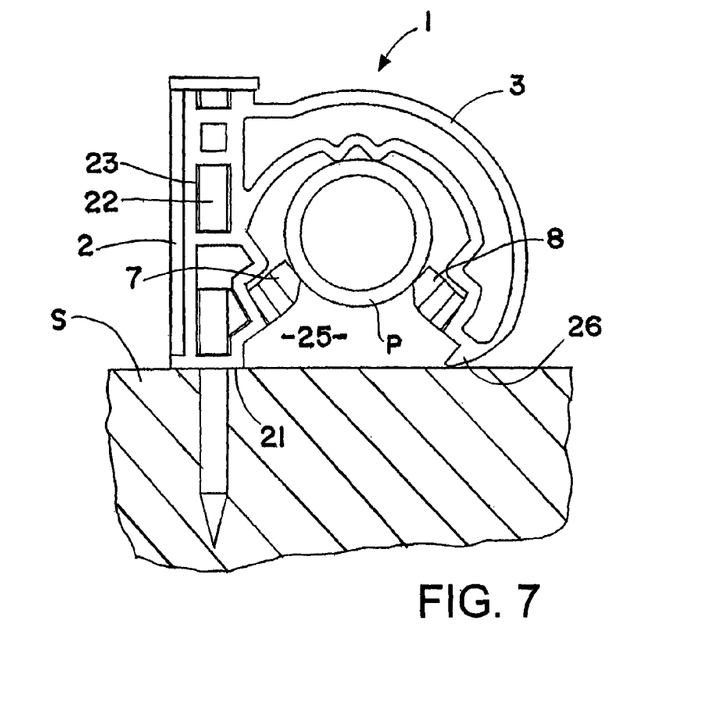
FIG. 7 is an enlarged schematic side view of the pipe clamp of FIG. 6 shown attached to a mounting surface by a fastener extending through a fastener hole in the clamp mounting post.
Figure 9:
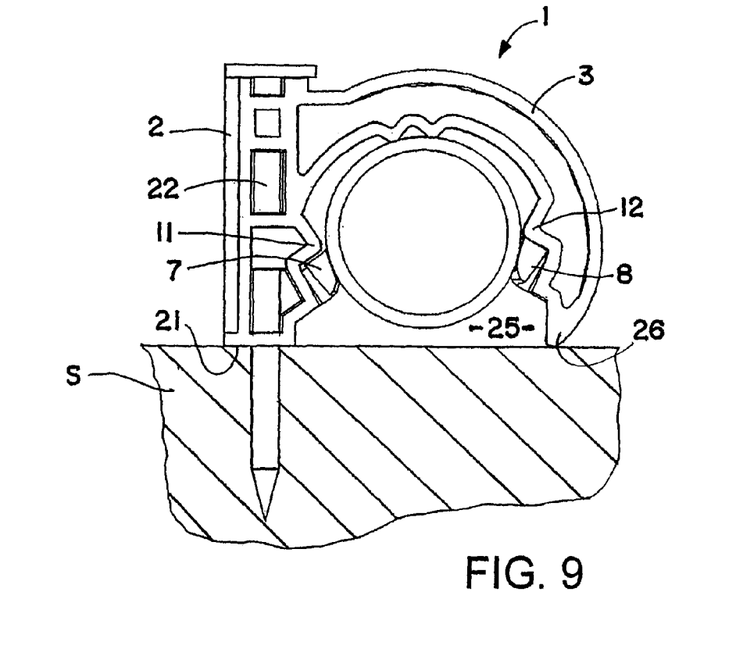
FIG. 9 is an enlarged schematic side view of the pipe clamp of FIG. 8 shown attached to a mounting surface by a fastener extending through a fastener hole in the clamp mounting post.
Figure 10:
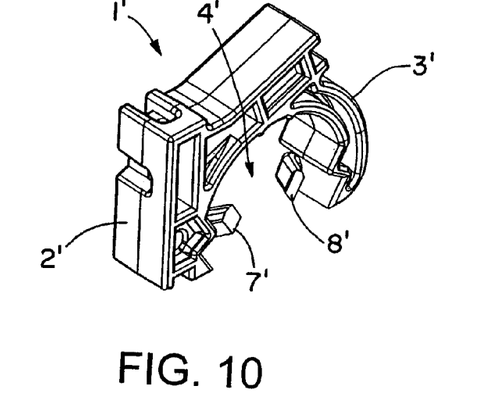
FIG. 10 is a perspective view of another form of pipe clamp of the present invention.
Figure 11:
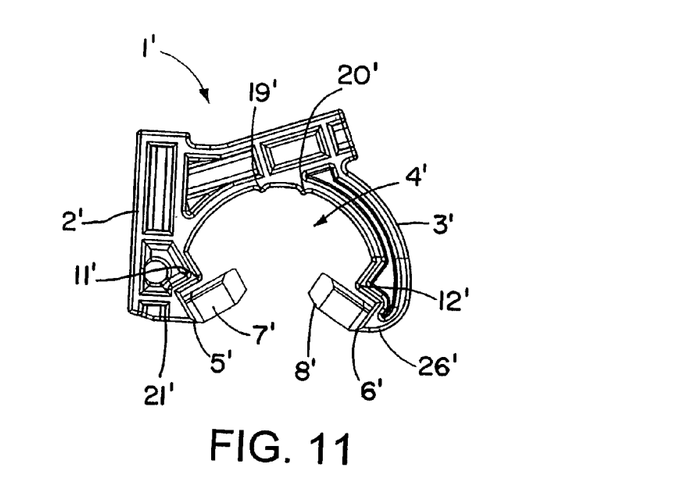
FIG. 11 is a side view of the pipe clamp of FIG. 10 as seen from the right side thereof.
Figure 12:
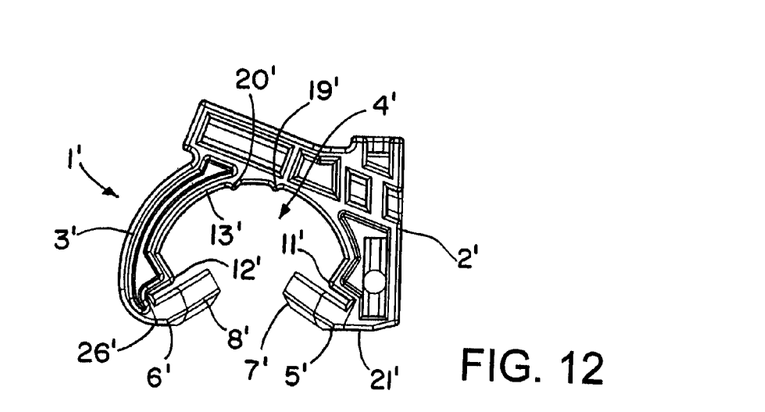
FIG. 12 is a side view of the opposite side of the pipe clamp of FIGS. 10 and 11.
Figure 13:
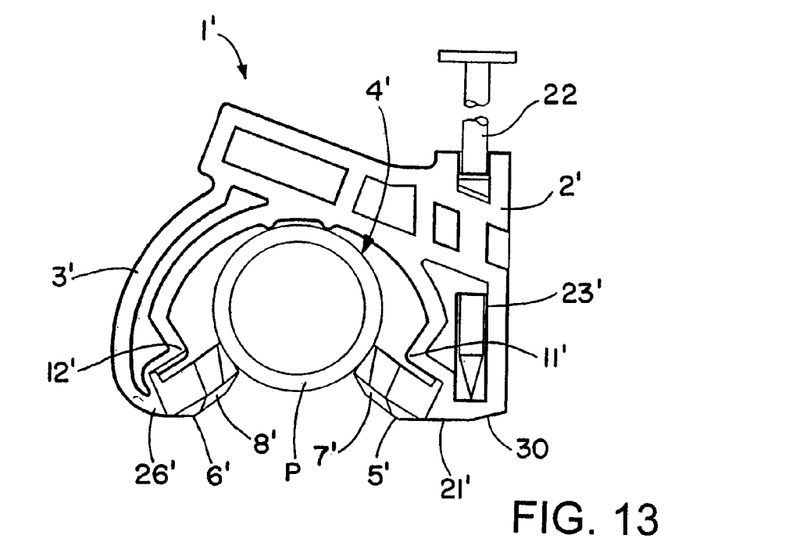
FIG. 13 is an enlarged schematic side view of the pipe clamp of FIG. 12 shown snap fitted onto a smaller size pipe prior to attaching the pipe clamp to a mounting surface.

As also shown in FIGS. 7 and 9, the bottom surface 21 of mounting post 2 desirably extends below the pipe, regardless of whether the pipe is the smaller size shown in FIG. 7 or the larger size shown in FIG. 9, to provide a clearance space 25 between the pipe and mounting surface when the mounting post is attached to the mounting surface to allow for expansion of the pipe, eliminate contact between the pipe and the mounting surface and insulate against sound and vibration. If desired, the fastener hole 23 may be slightly undersized to permit the fastener to be preloaded in the fastener hole thus eliminating the need to have to hold the fastener.

Figure 1:
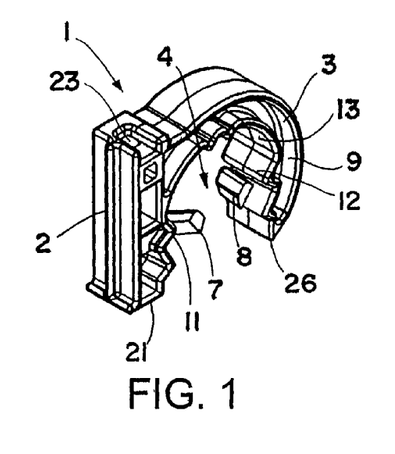
FIG. 1 is a perspective view of one form of pipe clamp of the present invention.
Figure 2:
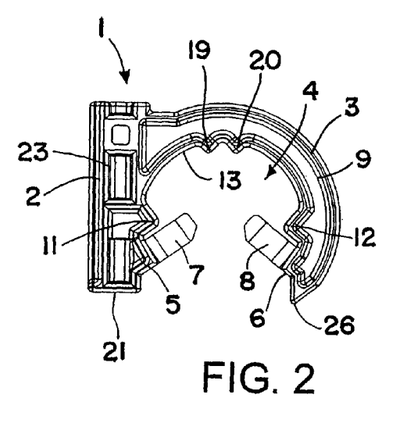
FIG. 2 is a side view of the pipe clamp of FIG. 1 as seen from the right side of FIG. 1.
Figure 3:
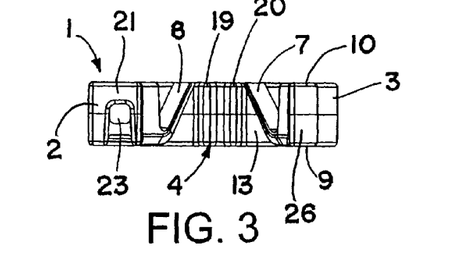
FIG. 3 is a bottom plan view of the pipe clamp of FIG. 2.
Figure 4:
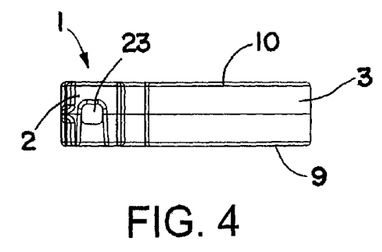
FIG. 4 is a top plan view of the pipe clamp of FIG. 2.
Figure 5:
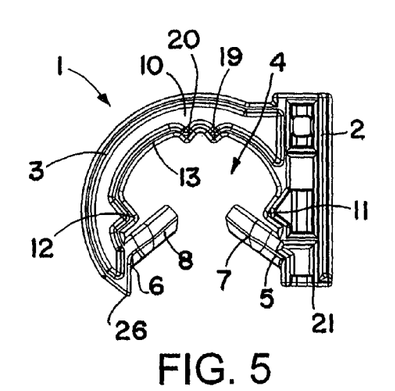
FIG. 5 is a side view of the opposite side of the pipe clamp of FIGS. 1 and 2.

The outermost end of arm 3 may have a beveled tip 26 which, when the clamp 1 is in the fully relaxed condition, extends slightly below the bottom surface 21 of the mounting post 2 as shown in FIGS. 2 and 5. Likewise, when the clamp is snap fitted onto a smaller size pipe P, the beveled tip 26 may still extend below the bottom surface of the mounting post as schematically shown in FIG. 6. This has the advantage that after the pipe clamp is snap fitted onto the smaller size pipe and the pipe clamp is attached to a mounting surface with the bottom surface of the mounting post engaging the mounting surface, the beveled tip 26 will be cammed inwardly toward the mounting post to cause the arm to more tightly grip the pipe as schematically shown in FIG. 7.

However, when the pipe clamp 1 is snap fitted onto a larger size pipe P', the arm 3 is expanded radially outwardly preferably to bring the tip 26 into substantial alignment with the bottom surface 21 of the mounting post 2 as schematically shown in FIG. 8. Accordingly, when the pipe clamp with the larger size pipe fully inserted into the recess is attached to the mounting surface S with the bottom surface of the mounting post engaging the mounting surface, the tip 26 will also firmly engage the mounting surface as schematically shown in FIG. 9.

FIGS. 10-18 show another form of pipe clamp 1' of the present invention that is substantially similar to the pipe clamp 1 previously described. Accordingly, the same reference numbers followed by a prime symbol are used to designate like parts.

Pipe clamp 1', like pipe clamp 1, is for selectively mounting different size pipe off a suitable mounting surface such as a vertical stud or horizontal floor or ceiling joist or the like, and includes flexible fingers 7', 8' adjacent opposite ends 5', 6' of recess 4' that extend radially inwardly adjacent the opposite ends of the recess, the fingers being axially and radially inwardly inclined toward the axial center of the recess from one side of the clamp toward the opposite side to facilitate radial and axial inward bending of the fingers when contacted by the pipe during insertion of the pipe into the recess for securely retaining the pipe in the recess. A rib 11', 12' may extend inwardly from the inner surface 13' of the recess in closely spaced substantially parallel relation to an inner side edge of the respective fingers, 7', 8' for guiding the radial and axial inward bending of the fingers when contacted by the pipe during insertion of the pipe into the recess. A pair of circumferentially spaced, axially extending ribs 19', 20' are desirably provided on the radial inner surface 13' of the recess intermediate opposite ends thereof for cradling the different size pipe P and P' when the clamp is snap fitted onto the pipe as shown, for example, in FIGS. 14 and 16.

Figure 14:
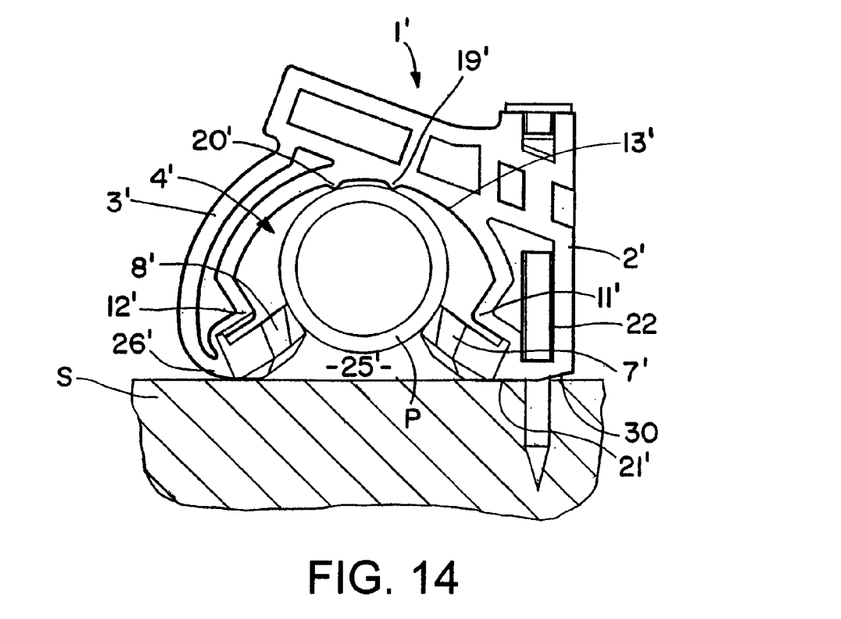
FIG. 14 is an enlarged schematic side view of the pipe clamp of FIG. 13 shown attached to a mounting surface by a fastener extending through a fastener hole in the clamp mounting post.

However, pipe clamp 1' differs from pipe clamp 1 in that the outermost end 26' of the arm 3' of pipe clamp 1' is desirably in substantial alignment with the bottom surface 21' of the mounting post 2' when in the fully relaxed condition shown in FIGS. 10-13. Accordingly, when the clamp 1' with a smaller size pipe P fully inserted into the arcuate recess 4' is attached to a mounting surface S with the bottom surface 21' of the mounting post 2' engaging the mounting surface, the outermost end 26' of arm 3' will also engage the mounting surface as schematically shown in FIG. 14. In this example, the bottom surface 21' of the mounting post 2' still extends below the smaller size pipe P to provide a clearance space 25' between the pipe and the mounting surface as further shown in FIG. 14.

Figure 15:
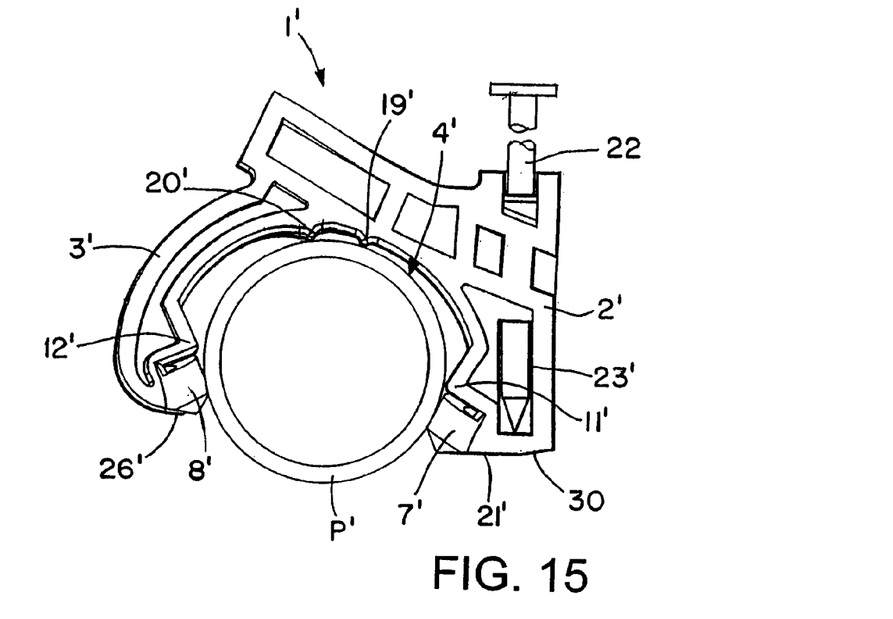
FIG. 15 is an enlarged schematic side view of the pipe clamp of FIG. 12 shown snap fitted onto a larger size pipe prior to attaching the pipe clamp to a mounting surface.
Figure 16:
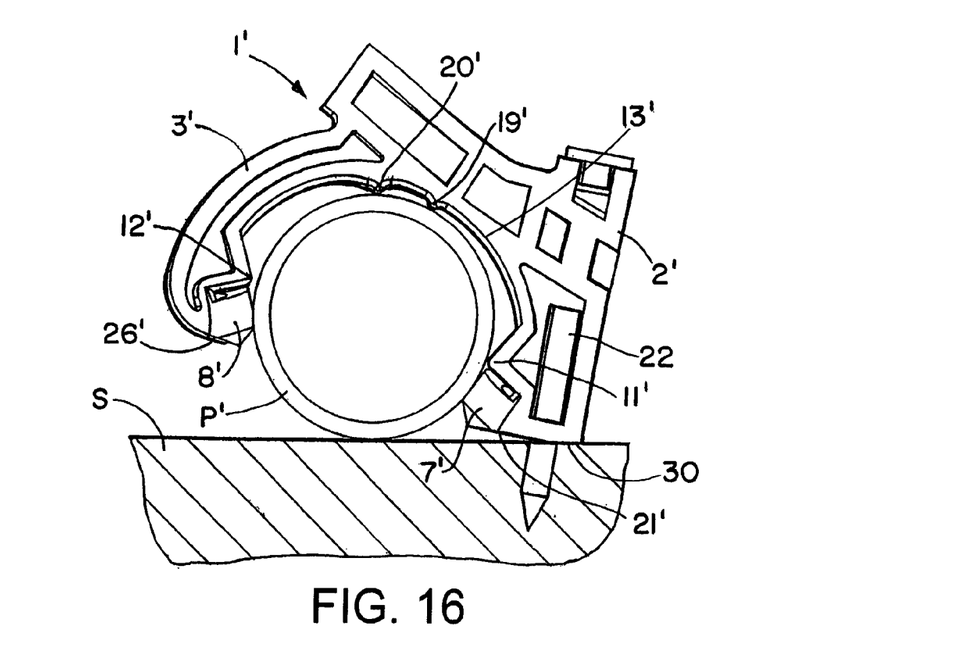
FIG. 16 is an enlarged schematic side view of the pipe clamp of FIG. 15 shown attached to a mounting surface by a fastener extending through a fastener hole in the clamp mounting post.

However, the bottom surface 21' of the mounting post 2' of pipe clamp 1' is substantially in line with the opposite ends 5', 6' of the arcuate recess 4'. Accordingly, when the pipe clamp 1' is snap fitted onto a larger size pipe P', the outer diameter of the larger size pipe protrudes outwardly beyond the bottom surface 21' of the mounting post 2' as shown in FIG. 15. Also the outermost end 26' of the arm 3' is expanded radially outwardly such that the outer diameter of the larger size pipe P' extends somewhat further outwardly beyond the outermost end 26' of the arm 3' as further shown in FIG. 15. Moreover, the bottom surface 21' of the mounting post 2' desirably has a tapered outer surface 30 that is in substantial alignment with the outwardly protruding outer diameter of the larger size pipe P' when fully inserted into the recess 4'. Thus, when the pipe clamp 1' with the larger size pipe fully inserted into the recess 4' is attached to the mounting surface S as by driving a suitable fastener 22 through the fastener hole 23' in the mounting post 2' into the mounting surface, the tapered outer surface 30 of the mounting post 2' and the outwardly protruding outer diameter of the larger size pipe P are clamped against the mounting surface as schematically shown in FIG. 16.

Figure 17:
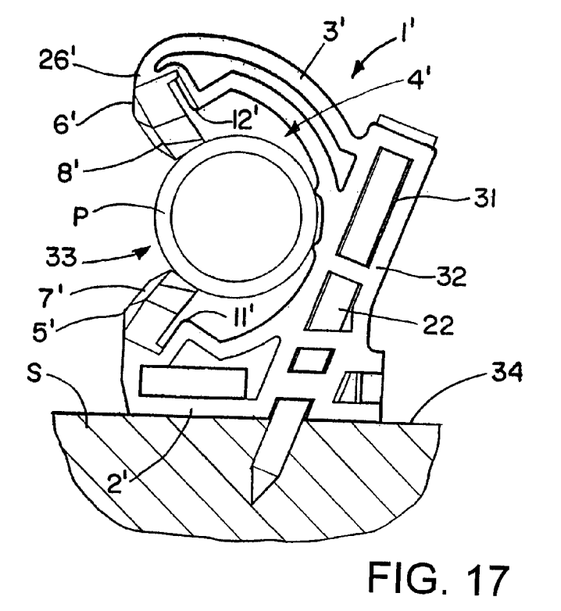
FIGS. 17 and 18 are enlarged schematic side views of the pipe clamp of FIGS. 13 and 15 shown attached to a mounting surface by a fastener extending through another fastener hole in the pipe clamp extending at an obtuse angle to the flat outer surface of the mounting post.
Figure 18:
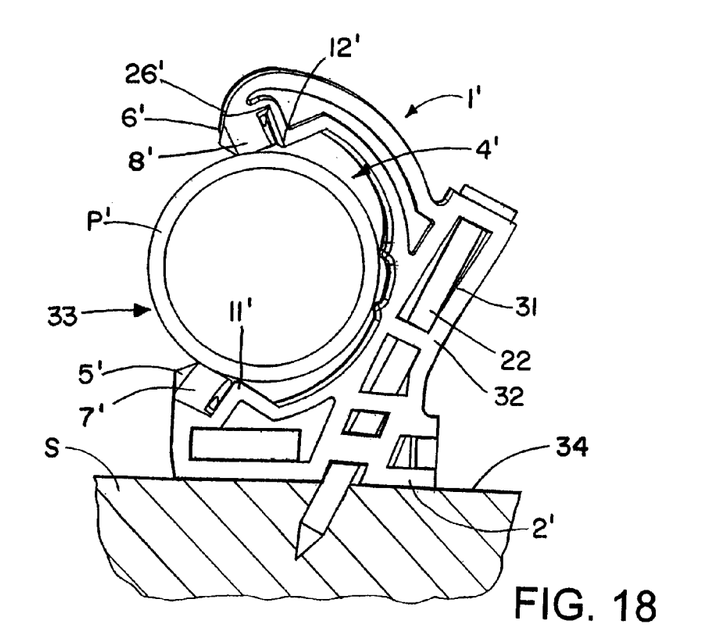

Pipe clamp 1' may also have another fastener hole 31 extending through a portion 32 of the arm 3' opposite the opening 33 between the spaced apart ends 5', 6' of the recess 4' and out the flat outer surface 34 of the mounting post 2' to permit the pipe clamp 1' to be attached to the mounting surface S by pressing the flat outer surface 34 of the mounting post 2' up against the mounting surface S and driving a suitable fastener such as a nail 22 through the fastener hole 31 into the mounting surface as schematically shown in FIGS. 17 and 18. Preferably the fastener hole 31 is at an obtuse angle of, for example, about 110° to the flat outer surface 34 of the mounting post 2', whereby when the pipe clamp 1' is attached to the side of a horizontal floor or ceiling joist or the like, the pipe clamp can be oriented to make it easier to drive a fastener through the angled fastener hole 31 into the joist using a hammer or the like.

Although the invention has been shown and described with respect to a certain embodiment, it is obvious that equivalent alterations and modifications will occur to others skilled in the art upon the reading and understanding of the specification. In particular, with regard to the various functions performed by the above-described components, the terms used to describe such components are intended to correspond, unless otherwise indicated, to any component which performs the specified function of the desired component (e.g., that is functionally equivalent), even though not structurally equivalent to the disclosed component which performs the function of the herein illustrated exemplary embodiment of the invention. In addition, while a particular feature of the invention may have been disclosed with respect to only one embodiment, such feature may be combined with one or more other features as may be desired and advantageous for any given or particular application.

What is claimed is:

1. A pipe clamp for selectively supporting different size pipe, the clamp comprising a mounting post, and a flexible arm extending from the mounting post, the arm and the post defining a recess having spaced apart opposite ends between which the different size pipe is selectively insertable into the recess, and opposed flexible fingers extending radially inwardly from the recess, the fingers extend radially inwardly toward a center of the recess, wherein the fingers are axially inwardly inclined away from the arm and post and toward the center of the recess from one side of the clamp toward an opposite side of the clamp to form gaps between ends of the fingers and the arm and the post to facilitate bending of the fingers relative to the arm and the post when contacted by the pipe during insertion of the pipe into the recess for retaining the pipe in the recess;
   wherein the mounting post has a bottom surface that extends below the pipe when fully inserted into the recess to provide a clearance space between the pipe and a mounting surface when the clamp is attached to the mounting surface with the bottom surface of the mounting post in engagement with the mounting surface;
   wherein when a larger size pipe than the pipe is fully inserted into the recess, an outer diameter of the larger size pipe protrudes outwardly beyond the bottom surface of the mounting post, whereby when the clamp with the larger size pipe fully inserted into the recess is attached to the mounting surface with the bottom surface of the mounting post engaging the mounting surface, the outwardly protruding outer diameter of the large size pipe is clamped against the mounting surface; and
   wherein the bottom surface of the mounting post has a tapered outer surface that is in substantial alignment with the outwardly protruding outer diameter of the larger size pipe when the larger size pipe is fully inserted into the recess, whereby both the tapered outer surface of the mounting post and the outwardly protruding outer diameter of the larger size pipe are clamped against the mounting surface when the clamp with the larger size pipe fully inserted into the recess is attached to the mounting surface.

2. The clamp of claim 1 further comprising a pair of circumferentially spaced, axially extending ribs on a radial inner surface of the recess intermediate the opposite ends thereof for cradling the pipe between the ribs when inserted into the recess.

3. The clamp of claim 1 further comprising a rib extending inwardly from a radial inner surface of the recess in closely spaced, substantially parallel relation to an inner side edge of each of the fingers for guiding the radial and axial inward bending of the fingers when contacted by the pipe during insertion of the pipe into the recess.

4. The clamp of claim 1 wherein the fingers are chamfered.

5. The clamp of claim 1 wherein an outermost end of the arm is in substantial alignment with the bottom surface of the mounting post when the clamp is in a fully relaxed condition and after the one size pipe is fully inserted into the recess, whereby when the clamp with the one size pipe fully inserted into the recess is attached to the mounting surface with the bottom surface of the mounting post engaging the mounting surface, the outermost end of the arm engages the mounting surface.

6. The clamp of claim 1 wherein a fastener hole extends through the mounting post and out the bottom surface for attaching the bottom surface of the mounting post to the mounting surface.

7. The clamp of claim 6 wherein another fastener hole extends through a portion of the arm opposite an opening between the spaced apart ends of the recess at an obtuse angle to a flat outer surface of the mounting post for attaching the flat outer surface of the mounting post to the mounting surface.

8. A pipe clamp for selectively supporting different size pipe, the clamp comprising a mounting post, and a flexible arm extending from the mounting post, the arm and the post defining a recess having spaced apart opposite ends between which the different size pipe is selectively insertable into the recess, opposed flexible fingers extending radially inwardly from the recess, the fingers extend radially inwardly toward a center of the recess, wherein the fingers are axially inwardly inclined away from the arm and post from one side of the clamp toward an opposite side of the clamp to form gaps between ends of the fingers and the arm and the post to facilitate inward bending of the fingers relative to the arm and the post when contacted by the pipe during insertion of the pipe into the recess for retaining the pipe in the recess, and ribs extending inwardly from a radial inner surface of the recess in closely spaced, substantially parallel relation to an inner side edge of each of the fingers for guiding the inward bending of the fingers when contacted by the pipe during insertion of the pipe into the recess;
   wherein when a one size pipe is fully inserted into the recess, an outer diameter of the one size pipe protrudes outwardly beyond a bottom surface of the mounting post, whereby when the clamp with the one size pipe fully inserted into the recess is attached to a mounting surface with the bottom surface of the mounting post engaging the mounting surface, the outwardly protruding outer diameter of the one size pipe is clamped against the mounting surface; and
   wherein the bottom surface of the mounting post has a tapered outer surface that is in substantial alignment with the outwardly protruding outer diameter of the larger size pipe when the larger size pipe is fully inserted into the recess, whereby both the tapered outer surface of the mounting post and the outwardly protruding outer diameter of the larger size pipe are clamped against the mounting surface when the clamp with the larger size pipe fully inserted into the recess is attached to the mounting surface.

9. The clamp of claim 8 wherein the fingers are chamfered.

10. The clamp of claim 8 wherein the bottom surface extends below the one size pipe when the one size pipe is fully inserted into the recess to provide a clearance space between the one size pipe and the mounting surface when the clamp is attached to the mounting surface with the bottom surface of the mounting post in engagement with the mounting surface.

11. The clamp of claim 8 wherein the a fastener hole extends through the mounting post and out the bottom surface for attaching the bottom surface of the mounting post to the mounting surface.

12. The clamp of claim 11 wherein another fastener hole extends through a portion of the arm opposite an opening between the spaced apart ends of the recess at an obtuse angle to a flat outer surface of the mounting post for attaching the flat outer surface of the mounting post to the mounting surface.

13. A pipe clamp for selectively supporting different size pipe, the clamp comprising a mounting post and a flexible arm extending from the mounting post, the arm and the mounting post defining a recess having spaced apart opposite ends between which the different size pipe is selectively insertable into the recess, wherein when one size pipe is fully inserted into the recess, an outer diameter of the one size pipe protrudes outwardly beyond the bottom surface of the mounting post, whereby when the clamp with the one size pipe fully inserted into the recess is attached to a mounting surface with the bottom surface of the mounting post engaging the mounting surface, the outwardly protruding outer diameter of the one size pipe is clamped against the mounting surface, and wherein the bottom surface of the mounting post has a tapered outer surface that is in substantial alignment with the outwardly protruding outer diameter of the one size pipe when the one size pipe is fully inserted into the recess, whereby both the tapered outer surface of the mounting post and the outwardly protruding outer diameter of the one size pipe are clamped against the mounting surface when the clamp with the one size pipe fully inserted into the recess is attached to the mounting surface.

14. A pipe clamp for selectively supporting different size pipe, the clamp comprising a mounting post, and a flexible arm extending from the mounting post, the arm and the mounting post defining a recess having spaced apart opposite ends between which the different size pipe is selectively insertable into the recess, wherein the mounting post has a bottom surface, and a fastener hole extends through the mounting post and out the bottom surface for attaching the bottom surface of the mounting post to a mounting surface, and wherein another fastener hole extends through a portion of the arm opposite an opening between the spaced apart ends of the recess at an obtuse angle to a flat outer surface of the mounting post for attaching the flat outer surface of the mounting post to the mounting surface.

15. A pipe clamp for selectively supporting different size pipe, the clamp comprising a mounting post, and a flexible arm extending from the mounting post, the arm and the post defining a recess having spaced apart opposite ends between which the different size pipe is selectively insertable into the recess, and opposed flexible fingers extending radially inwardly from the recess, the fingers extend radially inwardly toward a center of the recess, wherein the fingers are axially inwardly inclined away from the arm and post and toward the center of the recess from one side of the clamp toward an opposite side of the clamp to form gaps between ends of the fingers and the arm and the post to facilitate bending of the fingers relative to the arm and the post when contacted by the pipe during insertion of the pipe into the recess for retaining the pipe in the recess;

wherein the mounting post has a bottom surface, and a fastener hole extends through the mounting post and out the bottom surface for attaching the bottom surface of the mounting post to a mounting surface; and     wherein another fastener hole extends through a portion of the arm opposite an opening between the spaced apart ends of the recess at an obtuse angle to a flat outer surface of the mounting post for attaching the flat outer surface of the mounting post to the mounting surface.

16. The clamp of claim 14 further comprising a pair of circumferentially spaced, axially extending ribs on a radial inner surface of the recess intermediate the opposite ends thereof for cradling the pipe between the ribs when inserted into the recess.

17. The clamp of claim 14 further comprising a rib extending inwardly from a radial inner surface of the recess in closely spaced, substantially parallel relation to an inner side edge of each of the fingers for guiding the radial and axial inward bending of the fingers when contacted by the pipe during insertion of the pipe into the recess.

18. The clamp of claim 14 wherein the fingers are chamfered.

19. The clamp of claim 14 wherein the bottom surface extends below the one size pipe when the one size pipe is fully inserted into the recess to provide a clearance space between the one size pipe and the mounting surface when the clamp is attached to the mounting surface with the bottom surface of the mounting post in engagement with the mounting surface.

20. The clamp of claim 18 wherein an outermost end of the arm is in substantial alignment with the bottom surface of the mounting post when the clamp is in a fully relaxed condition and after the one size pipe is fully inserted into the recess, whereby when the clamp with the one size pipe fully inserted into the recess is attached to the mounting surface with the bottom surface of the mounting post engaging the mounting surface, the outermost end of the arm engages the mounting surface.

21. The clamp of claim 18 wherein when a larger size pipe than the one size pipe is fully inserted into the recess, an outer diameter of the larger size pipe protrudes outwardly beyond the bottom surface of the mounting post, whereby when the clamp with the larger size pipe fully inserted into the recess is attached to the mounting surface with the bottom surface of the mounting post engaging the mounting surface, the outwardly protruding outer diameter of the large size pipe is clamped against the mounting surface.

22. The clamp of claim 20 wherein the bottom surface of the mounting post has a tapered outer surface that is in substantial alignment with the outwardly protruding outer diameter of the larger size pipe when the larger size pipe is fully inserted into the recess, whereby both the tapered outer surface of the mounting post and the outwardly protruding outer diameter of the larger size pipe are clamped against the mounting surface when the clamp with the larger size pipe fully inserted into the recess is attached to the mounting surface.

* * * * *